United States Patent
He et al.

(10) Patent No.: US 12,257,771 B2
(45) Date of Patent: Mar. 25, 2025

(54) THREE-DIMENSIONAL OBJECT ADDITIVE MANUFACTURING METHOD AND DEVICE, STORAGE MEDIUM, AND COMPUTER APPARATUS

(71) Applicant: ZHUHAI SAILNER 3D TECHNOLOGY CO., LTD., Zhuhai (CN)

(72) Inventors: Xingbang He, Zhuhai (CN); Qiancheng Yang, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 145 days.

(21) Appl. No.: 18/106,404

(22) Filed: Feb. 6, 2023

(65) Prior Publication Data
US 2023/0182382 A1   Jun. 15, 2023

Related U.S. Application Data

(63) Continuation of application No. PCT/CN2021/095862, filed on May 25, 2021.

(30) Foreign Application Priority Data

Aug. 11, 2020   (CN) .......................... 202010802200.4

(51) Int. Cl.
*B29B 13/08*   (2006.01)
*B29B 13/02*   (2006.01)
(Continued)

(52) U.S. Cl.
CPC .......... *B29C 64/165* (2017.08); *B29B 13/021* (2013.01); *B29B 13/022* (2013.01);
(Continued)

(58) Field of Classification Search
CPC ..... B29B 13/021; B29B 13/022; B29B 13/08; B29C 64/165; B29C 64/218;
(Continued)

(56) References Cited

U.S. PATENT DOCUMENTS

2003/0133822 A1\*   7/2003   Harryson ............... B33Y 30/00
                                                                                    419/35
2005/0049739 A1    3/2005   Kramer
(Continued)

FOREIGN PATENT DOCUMENTS

| CN | 1812878 A | 8/2006 |
|---|---|---|
| CN | 101616785 A | 12/2009 |

(Continued)

OTHER PUBLICATIONS

Translation of CN 111978707 A (published on Nov. 24, 2020).\*
(Continued)

*Primary Examiner* — Leo B Tentoni
(74) *Attorney, Agent, or Firm* — J.C. PATENTS

(57) ABSTRACT

Provided are a three-dimensional object additive manufacturing method and device, a storage medium and computer apparatus, where the method includes: forming a powder material layer by using a powder material; applying a liquid material onto the powder material layer according to layer printing data, where the liquid material dissolves at least part of the powder material, and the liquid material includes an active component capable of polymerization; and supplying energy to the powder material layer so that the active component in the liquid material is polymerized, the powder material itself is not polymerized and does not polymerize with the active component, and an area of the powder material layer to which the liquid material is applied is molded to obtain a slice layer of a three-dimensional object.

15 Claims, 5 Drawing Sheets

(51) Int. Cl.
*B29C 64/165* (2017.01)
*B29C 64/245* (2017.01)
*B29C 64/295* (2017.01)
*B29C 64/393* (2017.01)
*B33Y 10/00* (2015.01)
*B33Y 30/00* (2015.01)
*B33Y 40/10* (2020.01)
*B33Y 40/20* (2020.01)
*B33Y 50/02* (2015.01)
*B33Y 70/00* (2020.01)
*B29K 1/00* (2006.01)
*B29K 25/00* (2006.01)
*B29K 27/06* (2006.01)
*B29K 29/00* (2006.01)
*B29K 33/00* (2006.01)
*B29K 33/20* (2006.01)
*B29K 55/00* (2006.01)
*B29K 67/00* (2006.01)
*B29K 75/00* (2006.01)
*B29K 77/00* (2006.01)
*B29K 96/02* (2006.01)
*B29K 96/04* (2006.01)

(52) U.S. Cl.
CPC .......... *B29C 64/245* (2017.08); *B29C 64/295* (2017.08); *B29C 64/393* (2017.08); *B33Y 10/00* (2014.12); *B33Y 30/00* (2014.12); *B33Y 50/02* (2014.12); *B33Y 70/00* (2014.12); *B29K 2001/00* (2013.01); *B29K 2025/06* (2013.01); *B29K 2027/06* (2013.01); *B29K 2029/04* (2013.01); *B29K 2033/08* (2013.01); *B29K 2033/20* (2013.01); *B29K 2055/00* (2013.01); *B29K 2067/00* (2013.01); *B29K 2075/00* (2013.01); *B29K 2077/00* (2013.01); *B29K 2096/02* (2013.01); *B29K 2096/04* (2013.01); *G05B 2219/49023* (2013.01)

(58) Field of Classification Search
CPC ... B29C 64/245; B29C 64/291; B29C 64/295; B29C 64/386; B29C 64/393; B29C 71/02; B29C 71/04; B29K 2001/00; B29K 2025/06; B29K 2027/06; B29K 2029/04; B29K 2033/08; B29K 2033/20; B29K 2055/00; B29K 2067/00; B29K 2075/00; B29K 2077/00; B29K 2096/02; B29K 2096/04; B33Y 10/00; B33Y 30/00; B33Y 40/10; B33Y 40/20; B33Y 50/00; B33Y 50/02; G05B 2219/49023

USPC ...... 264/113, 128, 236, 308, 331.11, 331.17, 264/331.18, 331.19, 331.21, 460, 463, 264/494; 425/135, 143, 145, 174, 174.4, 425/375; 700/119
See application file for complete search history.

(56) References Cited

U.S. PATENT DOCUMENTS

2007/0007698 A1* 1/2007 Sano ................. B29C 64/165
 264/113 X
2010/0291314 A1* 11/2010 Kashani-Shirazi ... B29C 64/165
 524/502
2016/0263828 A1 9/2016 Ederer
2016/0263829 A1 9/2016 Okamoto
2016/0318250 A1 11/2016 Moussa
2022/0241867 A1* 8/2022 Noble ................. B29C 64/165

FOREIGN PATENT DOCUMENTS

| | | |
|---|---|---|
| CN | 103554455 A | 2/2014 |
| CN | 105965881 A | 9/2016 |
| CN | 109070445 A | 12/2018 |
| CN | 110167743 A | 8/2019 |
| CN | 111976134 A | 11/2020 |
| CN | 111978479 A | 11/2020 |
| CN | 111978707 A | 11/2020 |
| EP | 1628823 B1 | 3/2006 |
| JP | 2007502713 A | 2/2007 |
| JP | 2016168704 A | 9/2016 |
| JP | 2017210620 A | 11/2017 |
| JP | 2018199283 A | 12/2018 |
| JP | 2019513596 A | 5/2019 |
| JP | 2019521015 A | 7/2019 |
| WO | WO2009145069 A1 | 12/2009 |

OTHER PUBLICATIONS

International Search Report of PCT/CN2021/095862, (Aug. 5, 2021).
First Office Action of the priority application CN202010802200.4, (May 27, 2021).
Second Office Action of the priority application CN202010802200. 4, (Aug. 2, 2021).
Notice of Allowance of the priority application CN202010802200. 4, (Sep. 15, 2021).
First Office Action of the parallel application JP2023-508595, (Jan. 30, 2024).
Extended Search Report for EP218551687.

* cited by examiner

THREE-DIMENSIONAL OBJECT ADDITIVE MANUFACTURING METHOD AND DEVICE, STORAGE MEDIUM, AND COMPUTER APPARATUS

CROSS-REFERENCE TO RELATED APPLICATIONS

The present application is a continuation of International Application No. PCT/CN2021/095862, filed on May 25, 2021, which claims priority to Chinese Patent Application No. 202010802200.4, filed on Aug. 11, 2020, both of which are hereby incorporated by reference in their entireties.

TECHNICAL FIELD

The application relates to the technical field of three-dimensional object molding, in particular to a three-dimensional object additive manufacturing method and device, a storage medium and a computer apparatus.

BACKGROUND

A main process of the three-dimensional object additive manufacturing technology includes: obtaining a digital model of a three-dimensional object, slicing and layering the digital model, and performing a data processing and converting on each slice layer to obtain printing data of each slice layer, printing, by the printing apparatus, layer by layer according to the printing data of each slice layer and stacking them to manufacture a three-dimensional object.

The existing three-dimensional object additive manufacturing technology includes an inkjet printing technology and a technology of combining powder with inkjet printing. Where, the inkjet printing technology mainly means that a printing head selectively sprays a photosensitive resin material on a support platform according to layer patterning data (also called printing data) of a three-dimensional object, and a radiation source irradiates the sprayed photosensitive resin material to form a cured layer; however, the selection range of the material in the inkjet printing technology is relatively narrow, and it is difficult to produce a high-strength object, which limits its application in industrial filed and aerospace field.

In the existing technology of combining powder with inkjet printing, the printing head selectively sprays a liquid material on a powder material layer according to the layer printing data of a three-dimensional object, where the powder material contains a first active component, and the liquid material contains a second active component, and the first active component and the second active component contact with each other to conduct a chemical reaction so as to form a solidified slice layer. However, this molding method has a narrow selection range of the materials, and furthermore, because the powder material participates in the chemical reaction, the molding accuracy is easily reduced due to uneven reaction.

SUMMARY

Embodiments of the present application provide a three-dimensional object additive manufacturing method and device, storage medium and computer apparatus, which can effectively improve the mechanical strength of the three-dimensional object, reduce the porosity of the three-dimensional object and improve the density of the three-dimensional object.

In a first aspect, an embodiment of the present application provides a three-dimensional object additive manufacturing method, and the method includes:
  forming a powder material layer by using a powder material;
  applying a liquid material onto the powder material layer according to layer printing data, where the liquid material dissolves at least part of the powder material, and the liquid material includes an active component capable of polymerization; and
  supplying energy to the powder material layer so that the active component in the liquid material is polymerized, the powder material itself is not polymerized and does not polymerize with the active component, and an area of the powder material layer to which the liquid material is applied is molded to obtain a slice layer of a three-dimensional object.

Combined with the first aspect, in a feasible implementation, the powder material is selected from at least one of polystyrene, polyvinyl chloride, polyacrylonitrile, acrylonitrile-styrene-acrylate copolymer, polyamide, polyester, polyurethane, poly(meth)acrylate, polyvinyl fluoride, chlorinated polyolefin, block copolymer soluble by the active component, graft copolymer soluble by the active component, polyvinyl alcohol containing hydroxyl group, cellulose, and modified cellulose.

Combined with the first aspect, in a feasible implementation, the active component has an active group which can participate in a polymerization reaction, and the active group includes at least one of a carbon-carbon double bond, a hydroxyl group, a carboxyl group, a thiacyclopropane group, an isocyanate group, a carbonate group, an epoxy group, a cyclic amide group, a cyclic lactone structure, a cyclic anhydride structure and a cyclic acetal structure.

Combined with the first aspect, in a feasible implementation, the active component includes a first active component, the first active component has an active group, and the first active component dissolves at least part of the powder material.

Combined with the first aspect, in a feasible implementation, the active component further includes a second active component, the second active component has an active group, and the second active component does not dissolve the powder material.

Combined with the first aspect, in a feasible implementation, a mass ratio of the active component in the liquid material is 50%-100%.

Combined with the first aspect, in a feasible implementation, the active component includes a first active component having an active group and a second active component having an active group, where a mass ratio of the first active component in the liquid material is 10%-95%, and a mass ratio of the second active component in the liquid material is 0%-90%.

Combined with the first aspect, in a feasible implementation, the first active component is selected from at least one of a monomer containing a carbon-carbon double bond, a composition of a substance containing an epoxy group and a substance promoting ring-opening polymerization of the epoxy group, a liquid cyclic lactone, a sulfur heterocycle compound, a carbonic ester compound and a cyclic amide compound.

Combined with the first aspect, in a feasible implementation, the second active component is selected from at least one of a monomer and/or a prepolymer containing a carbon-carbon double bond, a diluent and/or a prepolymer containing an epoxy group, a monomer and/or a prepolymer promoting ring-opening polymerization of an epoxy group, a polyol, a solid cyclic lactone, a sulfur heterocycle compound and a cyclic amide compound.

Combined with the first aspect, in a feasible implementation, the first active component and/or the second active component include(s) an expanding group, the expanding group is able to participate in a polymerization reaction, and the expanding group is selected from at least one of a spiro ether structure, a spiro orthocarbonate structure, a spiro orthoester structure, a bicyclo orthoester structure and a bicyclo lactone structure.

Combined with the first aspect, in a feasible implementation, the first active component and/or the second active component include a combination of active groups, and the combination of active groups forms the expanding group in a polymerization reaction.

Combined with the first aspect, in a feasible implementation, the combination of active groups includes any one of a combination of a polyol group and an orthocarbonic acid diester group, and a combination of an epoxy group and a cyclic lactone structure.

Combined with the first aspect, in a feasible implementation, the liquid material further includes a first auxiliary agent, and the first auxiliary agent includes at least one of a free radical initiator, an anionic initiator, a cationic initiator and a catalyst; and/or, a mass ratio of the first auxiliary agent in the liquid material is 0%-10%.

Combined with the first aspect, in a feasible implementation, the liquid material further includes a second auxiliary agent, and the second auxiliary agent includes at least one of a flatting agent, a defoamer, a polymerization inhibitor, a surfactant, an antioxidant, a plasticizer and a dispersant; and/or, a mass ratio of the second auxiliary agent in the liquid material is 0.1%-30%.

Combined with the first aspect, in a feasible implementation, the liquid material further includes a colorant, and a mass ratio of the colorant in the liquid material is 0%-10%.

Combined with the first aspect, in a feasible implementation, before applying the liquid material onto the powder material layer according to the layer printing data, the method further includes:
preheating the powder material layer.

Combined with the first aspect, in a feasible implementation, after applying the liquid material onto the powder material layer according to the layer printing data, the method further includes:
heating the powder material layer after applying the liquid material to promote the active component in the liquid material to dissolve the powder material.

Combined with the first aspect, in a feasible implementation, the energy includes at least one of a radiant energy and a thermal energy.

Combined with the first aspect, in a feasible implementation, after supplying the energy to the powder material layer so that the active component in the liquid material is polymerized, and the area of the powder material layer to which the liquid material is applied is molded to obtain the slice layer of the three-dimensional object, the method further includes:
repeatedly performing formation of the powder material layer and application of the liquid material, and supplying energy to the powder material layer to which the liquid material is at least partly applied, where a plurality of obtained slice layers are stacked layer by layer to form the three-dimensional object.

Combined with the first aspect, in a feasible implementation, after the three-dimensional object is formed, the method further includes:
performing a heat treatment on the formed three-dimensional object to improve mechanical strength of the three-dimensional object.

In a second aspect, an embodiment of the present application provides a three-dimensional object additive manufacturing device for implementing the above three-dimensional object additive manufacturing method, including:
a powder supply component, configured to supply the powder material to form the powder material layer;
a molding platform, configured to support the powder material layer;
a material distributor, configured to apply the liquid material onto the powder material layer according to the layer printing data, where the liquid material dissolves at least part of the powder material, and the liquid material includes the active component capable of polymerization;
an energy supply device, configured to supply the energy to the powder material layer so that the active component in the liquid material is polymerized, and the powder material itself is not polymerized and does not polymerize with the active component, and an area of the powder material layer to which the liquid material is applied is molded to obtain the slice layer of the three-dimensional object.

Combined with the second aspect, in a feasible implementation, the three-dimensional object additive manufacturing device further includes a lifting mechanism, which is connected with the molding platform and drives the molding platform to ascend or descend in a vertical direction.

Combined with the second aspect, in a feasible implementation, the three-dimensional object additive manufacturing device further includes a preheating component and/or a heating component, where the preheating component is configured to preheat the powder material layer; the heating component is configured to heat the powder material layer after the liquid material is applied, to promote the active component in the liquid material to dissolve the powder material.

Combined with the second aspect, in a feasible implementation, the energy supply device, the preheating component and the heating component can be each selected from at least one of an ultraviolet lamp, an infrared lamp, a microwave emitter, a heating wire, a heating fin and a heating plate.

Combined with the second aspect, in a feasible implementation, the three-dimensional object additive manufacturing device further includes a temperature monitor for monitoring a temperature of the powder material layer.

Combined with the second aspect, in a feasible implementation, the three-dimensional object additive manufacturing device further includes a controller for controlling an operation of at least one of the powder supply component, the material distributor, the energy supply device, the preheating component, the heating component and the temperature monitor.

In a third aspect, an embodiment of the present application provides a non-transitory computer-readable storage medium, where the storage medium includes a stored program that controls, when running, a device where the storage medium is located to execute the above-mentioned three-dimensional object additive manufacturing method.

In a fourth aspect, an embodiment of the present application provides a computer apparatus including a memory, a processor, and a computer program stored in the memory and executable on the processor, where the processor executes the computer program to implement the above-mentioned three-dimensional object additive manufacturing method.

The technical solutions of the application have at least the following beneficial effects:

embodiments of the present application provide three-dimensional object additive manufacturing method and device, a storage medium and a computer apparatus, where a liquid material containing an active component is applied on a powder material layer, and the active component dissolves at least part of the powder material, and the active component forms a high-molecular polymer through a polymerization reaction, and the formed high-molecular polymer forms a blend with the powder material, especially reaches a molecular level of blending with the dissolved powder material to form a high-molecular alloy, which makes that there are good connections between the powder materials, between the powder material and the polymer of the active component, and between molded slice layers of three-dimensional object. In addition, the formed high-molecular polymer can be blended with the powder material to obtain a "sea-island structure" or homogeneous structure with good interface bonding, thereby improving the mechanical strength of the three-dimensional object.

In the present application, the active component in the liquid material fills gaps in the powder material, dissolves the powder material, further reduces the internal porosity of the three-dimensional object and improves the compactness of the three-dimensional object. The active component undergoes a polymerization reaction to form a high-molecular polymer, which reaches a molecular level of blending with the powder material, easily obtaining a colorless or light-colored transparent three-dimensional object.

In the present application, the layers of the three-dimensional object formed through the polymerization reaction of the active component in the liquid material, and the manufactured three-dimensional object basically have no small molecular substance residue, and no small molecular substance precipitated in the use process, thereby meeting the requirements of safety and environmental protection.

In this application, a three-dimensional object with different properties in different areas can be realized by adjusting a spraying amount of the liquid material.

BRIEF DESCRIPTION OF DRAWINGS

In order to more clearly explain the technical solutions in the embodiments of the present application, the following will briefly introduce the drawings needed in the description of the embodiments. Obviously, the drawings in the following description are only some of the embodiments of the present application. For those of ordinary skill in this field, other drawings can be obtained according to these drawings without any creative labor.

DESCRIPTION OF EMBODIMENTS

In order to better understand the technical solutions of the present application, the embodiments of the present application will be described in detail below with reference to the drawings.

It should be clear that the described embodiments are only part of the embodiments of the present application, but not all of them. Based on the embodiments in the present application, all other embodiments obtained by those with ordinary skills in the art without creative labor belong to the scope of protection in the present application Terms used in the embodiments of the present application are only for the purpose of describing specific embodiments, and are not intended to limit the present application. The singular forms of "a", "said" and "the" used in the embodiments of the present application and the appended claims are also intended to include plural form, unless the context clearly indicates other meanings.

It should be understood that the term "and/or" used in the context is only a description of association relationship of the associated objects, indicating that three relationships can exist, for example, A and/or B, which can indicate the following three cases: A exists alone, both A and B exist, and B exists alone. In addition, the character "/" in the context generally indicates that the associated object before and after it is an "or" relationship.

Figure 1:
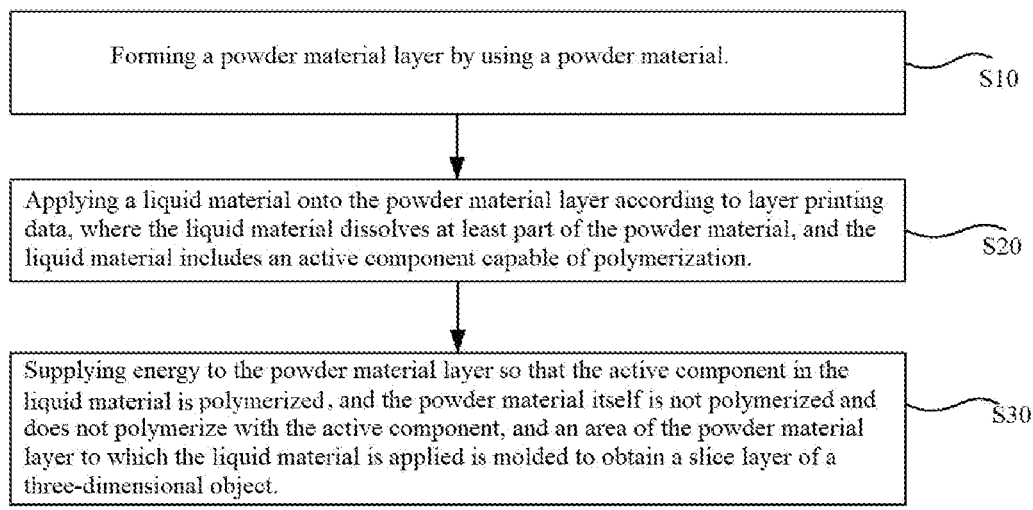
FIG. 1 is a flow chart of a three-dimensional object additive manufacturing method provided by a specific embodiment of the present application.

FIG. 1 is a flow chart of a three-dimensional object additive manufacturing method provided by a specific embodiment of the present application. Please refer to FIG. 1. The present embodiment provides a three-dimensional object additive manufacturing method, which includes the following steps:

S10, forming a powder material layer by using a powder material;

S20, applying a liquid material onto the powder material layer according to layer printing data, where the liquid material dissolves at least part of the powder material, and the liquid material includes an active component capable of polymerization; and S30, supplying energy to the powder material layer so that the active component in the liquid material is polymerized, and the powder material itself is not polymerized and does not polymerize with the active component, and an area of the powder material layer to which the liquid material is applied is molded to obtain a slice layer of a three-dimensional object.

In this solution, the active component in the liquid material is polymerized to form a high-molecular polymer, and the formed high-molecular polymer blends with the powder material to form a blend, especially reaches a molecular level of blending with the powder material dissolved in the liquid material, to form a polymer alloy, which makes that there are good connections between the powder materials, between the powder material and the polymer of the active component, and between the molded slice layers of three-dimensional object, the blend shows a "sea-island structure"

or homogeneous structure, thereby improving the mechanical strength of the three-dimensional object.

It should be noted that the sea-island structure is a two-phase system of the blend, where one phase is a continuous phase and the other phase is a dispersed phase, the granular powder material is dispersed in the continuous polymer to form a strong connection, which can improve the mechanical strength of the three-dimensional object.

Specifically, the powder material is a powdery material particle, which does not polymerize with the active component in the liquid material, and the powder material itself is not polymerized. In a feasible implementation, the powder material is selected from at least one of the group consisting of polystyrene (PS), polyvinyl chloride (PVC), polyacrylonitrile, acrylonitrile-styrene-acrylate copolymer (ASA), polyamide (PA), polyester, polyurethane (PU), poly(meth) acrylate, polyvinyl fluoride, chlorinated polyolefin, block copolymer soluble by the active component, graft copolymer soluble by the active component, polyvinyl alcohol (PVA) containing hydroxyl group, cellulose, and modified cellulose.

The melting point or melting temperature of the powder material in the present embodiment may be 60° C. to 300° C. The particle shape and particle size of the powder material are not particularly limited. When the powder material provided in the present embodiment forms the powder material layer, the fluidity of the powder material can meet the use requirement, the gaps formed in the powder materials can be fully filled by the applied liquid material, and the applied liquid material can wet the surface of the powder material and/or at least part of the powder material can be dissolved into the liquid material.

In a feasible implementation, according to the difference of manufacturing processes of powder materials, the powder material in the present embodiment can be spherical, dendritic, flaky, disk-shaped, needle-shaped, rod-shaped and other shapes. An average particle size of the powder is 1 μm to 400 μm, such as 1 μm, 5 μm, 10 μm, 30 μm, 50 μm, 100 μm, 150 μm, 200 μm, 250 μm, 300 μm, 350 μm or 400 μm, and the average particle size of the powder material is preferably 30 μm to 200 μm. The gap between particles in the powder material is about 5 nm to 100 μm, for example, 5 nm, 10 nm, 100 nm, 250 nm, 500 nm, 1 μm, 5 μm, 10 μm, 25 μm, 50 μm, 75 μm or 100 μm, and no limitation is made here. The gap between particles of the powder material in the present embodiment is in the range of 5 nm to 100 μm. When the liquid material is selectively applied to the powder material layer, the liquid material can quickly penetrate into the powder material layer through the gap and partially remain on the surface layer, thereby wetting the surface of the powder material in the selected area and at least partially dissolving the powder material. It should be noted that dissolution in the present embodiment refers to all possible situations except complete insolubility.

In a feasible implementation, a thickness of the powder material layer is 10 μm to 500 μm, for example, 10 μm, 25 μm, 50 μm, 75 μm, 100 μm, 125 μm, 150 μm, 200 μm, 300 μm, 400 μm or 500 μm. The thickness of the powder material layer is preferably 50 μm to 150 μm. Understandably, when the thickness of the powder material layer is thin, an object with high resolution can be formed, but the time taken to manufacture the object is greatly prolonged and the manufacturing cost is increased; when the thickness of the powder material layer is thick, the time for the liquid material to infiltrate the powder material will be prolonged, and the resolution of the manufactured object will be decreased, making it difficult to reach the expectation.

The powder material in the present application may also include an additive, which includes at least one of a flowing auxiliary agent and a filler. Where, the flowing auxiliary agent is used to improve the fluidity of the powder material, and may be, for example, silica, talcum powder, etc.; the filler is used to improve the mechanical strength of the three-dimensional object, and the filler may be, for example, a graphene, a carbon nanotube, a glass fiber, a kaolin, etc., and is not limited in the present embodiment.

In the present embodiment, the liquid material includes an active component capable of polymerization, and the active component dissolves at least part of the powder material. Preferably, the active component completely dissolves the powder material in contact with the active component.

Further, the active component in the liquid material has an active group that can participate in polymerization, and the active group includes at least one of carbon-carbon double bond, hydroxyl group, carboxyl group, thiacyclopropane group, isocyanate group, carbonate group, epoxy group, cyclic amide group, cyclic lactone structure, cyclic anhydride structure and cyclic acetal structure. It should be noted that the active component does not polymerize with the powder material. In the present embodiment, a mass ratio of the active component in the liquid material is 50%-100% based on a total mass of the liquid material being 100%.

The active component includes a first active component, the first active component has an active group, and the first active component dissolves at least part of the powder material. Specifically, the first active component may merely contain one substance that is able to dissolve the powder material, or a mixture of a plurality of substances that are able to dissolve the powder material, and the solubility of the plurality of substances to the powder material may be different or the same.

It should be noted that the dissolution in the present embodiment refers to all possible situations except complete insolubility. For example, when 1 g of the powder material is placed in 100 g of the active component, more than 0 g of the powder material is dissolved and at most 1 g of the powder material is dissolved. Preferably, the first active component completely dissolves the powder material. The dissolution of the powder material by the active component is not limited to be realized at a normal temperature, and can also be realized by heating and/or stirring. The dissolution is not limited to dissolution in one time, but also can be dissolved in multiple times and in stages. For example, if a slow dissolution occurs when the active component comes into contact with the powder material, the powder material can be heated to speed up the dissolution rate.

In the present embodiment, based on a total mass of the liquid material being 100%, the mass ratio of the first active component in the liquid material is 10%-95%. For example, it may be 10%, 20%, 30%, 40%, 50%, 60%, 70%, 80% or 95%. Of course, its mass ratio may also be assigned according to actual application, and is not limited here. Preferably, the mass ratio of the first active component in the liquid material is 30%-95%. In the present embodiment, the mass ratio of the first active component in the liquid material is greater than or equal to 30%. By increasing the mass ratio of the first active component in the liquid material, the dissolution rate and dissolution degree of the first active component to the powder material can be improved, thereby improving the mechanical strength of the printed object.

The first active component may be selected from at least one of a monomer containing carbon-carbon double bond, a composition of a substance containing an epoxy group and a substance promoting ring-opening polymerization of the epoxy group, a cyclic lactone, a sulfur heterocycle compound, a carbonic ester compound and a cyclic amide compound. Specifically, the monomer containing carbon-carbon double bond may be (meth)acrylates, vinyl ethers, allyl ethers, styrene, acryloyl morpholine, N-vinyl pyrrolidone and the like; the composition of a substance containing an epoxy group and a substance promoting ring-opening polymerization of the epoxy group may be composition of an epoxy diluent and at least one of a small molecule containing a hydroxyl group and a prepolymer containing a hydroxyl group, composition of an epoxy diluent and at least one of a small molecule containing a carboxyl group and a prepolymer containing a carboxyl group; the cyclic lactone is liquid cyclic lactone, which may be γ-butyrolactone, δ-valerolactone, ε-caprolactone, etc.; the sulfur heterocycle compound may be such as thiacyclopropane, thiacyclobutane, etc.; the carbonic ester compound may be dimethyl carbonate, diethyl carbonate, etc.; the cyclic amide compound may be caprolactam, etc.

Exemplarily, the first active component may be styrene or γ-butyrolactone and the powder material may be polystyrene that can be dissolved by styrene or γ-butyrolactone.

The first active component may also be a (meth)acrylate monomer, and the powder material may be poly(meth)acrylate, cellulose, modified cellulose, polyvinyl alcohol containing hydroxyl, polyester, polyurethane, modified polyamide and the like, which can be dissolved by the (meth)acrylate monomer.

The first active component may also be acryloyl morpholine, and the powder material may be polyurethane, cellulose, modified cellulose, polyvinyl alcohol containing hydroxyl group and the like, which can be partially dissolved by acryloyl morpholine.

The first active component may also be epichlorohydrin and epoxy diluent, and the powder material may also be polycarbonate, modified polyamide, cellulose ester, cellulose ether and the like, which can be dissolved by epichlorohydrin or epoxy diluent.

The first active component may be γ-butyrolactone, and the powder material may also be polyacrylonitrile, acetate fiber, polymethyl methacrylate, polyvinyl fluoride, polystyrene and the like, which can be dissolved by γ-butyrolactone.

The first active component may also be ε-caprolactone, and the powder material may also be chlorinated polyolefin, polyurethane and the like, which can be dissolved by ε-caprolactone.

Further, the active component may further include a second active component having an active group, the second active component does not dissolve the powder material, that is, the second active component does not dissolve the powder material at all. In a feasible implementation, the second active component itself may be polymerized, or may participate in the polymerization together with the first active component.

In the present embodiment, based on a total mass of the liquid material being 100%, a mass ratio of the second active component in the liquid material is 0%-90%. For example, it may be 0%, 10%, 20%, 30%, 40%, 50%, 60%, 70%, 80% or 90%. Of course, its mass ratio may also be assigned according to actual application, and is not limited here. Preferably, the mass ratio of the second active component in the liquid material is 20%-70%. By controlling the mass ratio of the second active component in the liquid material, on the premise of ensuring that the first active component dissolves the powder material, the second active component is complementary to the first active component in properties, so that the three-dimensional object has better properties, such as reduced shrinkage, than when it only contains the first active component. It should be noted that, in a three-dimensional object additive manufacturing process, the second active component may be filled into the gaps between the particles of the powder material or inside powder particles, reducing the porosity of the molded object and improving the molding density of the object. Further, the second active component may also be complementary to the first active component in property, so that the three-dimensional object has better properties than when it only contains the first active component.

In a specific embodiment, the second active component is selected from at least one of a monomer and/or a prepolymer containing a carbon-carbon double bond, a diluent and/or a prepolymer containing an epoxy group, a monomer and/or a prepolymer promoting ring-opening polymerization of an epoxy group, a polyol, a cyclic lactone, a sulfur heterocycle compound and a cyclic amide compound.

Exemplarily, the prepolymer containing the carbon-carbon double bond may be an epoxy or (modified) acrylate prepolymer, a polyester acrylate prepolymer, a polyurethane acrylate prepolymer, a pure acrylate prepolymer, etc.; the prepolymer containing the epoxy group may be, for example, E-51, E-41, etc.; the polyol prepolymer may be, for example, polyester diol, polyether diol, polycaprolactone diol, polycarbonate diol, etc.; the cyclic lactone may be lactide, glycolide, etc.; and the cyclic lactone itself is solid and has poor solubility. Some of the compounds containing the cyclic acetal structure, may be, for example, trioxymethylene, which itself is solid. The (meth)acrylate monomers have different solubility to the polymer due to their structural differences, for example, isobornyl acrylate, isobornyl methacrylate, lauryl acrylate, lauryl methacrylate and cyclotrimethylolpropane methylal acrylate, which has poor solubility to and basically cannot dissolve polyurethane powders.

Further, the first active component and/or the second active component have/has an expanding group, the expanding group is able to participate in a polymerization reaction, and the expanding group is selected from at least one of a spiro ether structure, a spiro orthocarbonate structure, a spiro orthoester structure, a bicyclo orthoester structure and a bicyclo lactone structure. For example, the active component containing the expanding group may be 3,9-diethyl-3,9-propenyloxymethyl-1,5,7,11-tetraoxaspiro[5,5]undecane, 3,9-dihydroxyethyl-3',9'-dibenzyl-1,5,7,11-tetraoxaspiro[5,5]undecane, and the like.

In a feasible implementation, the first active component and/or the second active component have/has a combination of active groups, the combination of active groups may form the expanding group in the polymerization reaction.

The combination of active groups includes any one of a combination of a polyol group and an orthocarbonic acid diester group, and a combination of an epoxy group and a cyclic lactone structure.

Understandably, the first active component and/or the second active component have/has an expanding group or the combination of active groups that may form the expanding group. In the process of polymerization of the first active component and/or the second active component, the expanding group will also undergo a chemical reaction, so that the volume of the formed polymer will be expanded, and the volume of the object will not be shrunk due to a curing process, and the finally molded three-dimensional object will have a higher dimensional accuracy. In addition, the volume expansion caused by the expanding group may reduce the porosity of the powder material, so that the polymer powders are compact, and improve the mechanical properties and mechanical strength of the object.

In the present embodiment, the molecular structure of the first active component and/or the second active component may also contain a functional group that does not participate in the polymerization reaction, and the functional group may be a hydrophilic group. Understandably, the hydrophilic group can improve the water solubility of the first active component and/or the second active component. Specifically, the hydrophilic group may be a hydroxyl group, a carboxyl group, etc. The functional group may also be a group with flame retardant function, such as a phosphate group, or a group with bactericidal function, such as a quaternary ammonium salt group.

Further, the liquid material further includes a first auxiliary agent, which is used for initiating or catalyzing the polymerization reaction of the active component, and the first auxiliary agent includes at least one of a free radical initiator, an anionic initiator, a cationic initiator and a catalyst. Specifically, based on a total mass of the liquid material being 100%, a mass ratio of the first auxiliary agent in the liquid material is 0%-10%, such as 0%, 1%, 2%, 3%, 4%, 5%, 6%, 7%, 8%, 9% or 10%. Of course, its mass ratio may also be assigned according to the actual usage, and is not limited here.

The free radical initiator may be a high-temperature free radical initiator, such as, one or more of the group consisting of dilauroyl peroxide, tert-amyl peroxy 2-ethylhexanoate, tert-butyl peroxy-2-ethylhexanoate, tert-butyl hydroperoxide (TBHP), tert-amyl hydroperoxide (TAHP), di-tert-butyl peroxide (DTBP) and di-tert-amyl peroxide (DTAP), dicumyl peroxide (DCP), ethyl 3,3-bis(tert-butylperoxy)butyrate, ethyl 3,3-bis(tert-amyl peroxy)butyrate, tert-butyl peroxybenzoate (TBPB), tert-butyl peroxy 3,3,5-trimethylhexanoate (TBPMH), tert-amyl peroxybenzoate (TAPB), tert-amyl peroxyacetate (TAPA), etc.

The free radical initiator may also be photo-free radical initiator, such as, one or more of the group consisting of benzoin ethyl ether, benzoin α,α-dimethyl benzil ketal, α,α-diethoxyacetophenone, 2-hydroxy-2-methyl-1-phenylacetone, 1-hydroxy-cyclohexyl benzophenone, 2-hydroxy-2-methyl-p-hydroxyethyl ether phenyl acetone-1, [2-methyl 1-(4-methylmercaptophenyl)-2-morpholinacetone-1], [2-benzyl-2-dimethylamino-1-(4-morpholinphenyl)butanone-1], benzoyl formic ester, 2,4,6-trimethylphenylacyl-ethoxy-phenyl phosphine oxide, 2,4, 6-trimethylphenylacyl-diphenyl phosphine oxide, bis(2,4,6-trimethylphenylacyl) phenyl phosphine oxide, 4-p-toluenemercapto benzophenone, etc.

The anionic initiator may be butyl lithium, butyl lithium oxide, etc.

The cationic initiator may be triarylsulfonium hexafluorophosphoric salt mixture, blocked phosphoric salt cationic initiator, 4-(phenylthio) phenyldiphenylsulfonium hexafluorophosphoric salt, 4-isobutylphenyl-4'-methylphenyliodonium hexafluorophosphoric salt and η6-cumenecyclopentadienyliron (II)hexafluorophosphoric salt mixture.

The catalyst may be ethylene glycol, stannous isocaprylate, stannous caprylate, dibutyltin dilaurate, methyl fluorosulfonic acid, ethyl fluorosulfonic acid, methylnitrobenzenesulfonic acid, methyl methanesulfonate or tetraphenylporphyrin aluminide, etc.

Further, the liquid material further includes a second auxiliary agent, and the second auxiliary agent is selected from at least one of a flatting agent, a defoamer, a surfactant, a polymerization inhibitor, an antioxidant, a plasticizer and a dispersant. Specifically, based on a total mass of the liquid material being 100%, a mass ratio of the second auxiliary agent in the liquid material is 0.1%-30%, such as 0.1%, 1%, 5%, 10%, 15%, 20%, 25% or 30%. Of course, its mass ratio may also be assigned according to the actual usage, and is not limited herein.

Exemplarily, a mass ratio of the flatting agent in the liquid material is 0.01%-3%; a mass ratio of the defoamer in the liquid material is 0.01%-3%; a mass ratio of the surfactant in the liquid material is 0%-5%; a mass ratio of the polymerization inhibitor in the liquid material is 0.05%-3%; a mass ratio of the antioxidant in the liquid material is 0.05-3%; a mass ratio of the plasticizer in the liquid material is 0%-25%; and a mass ratio of the dispersant in liquid material is 0%-5%.

It should be noted that the function of the flatting agent is to improve the fluidity of the liquid material and the wettability on the powder material, and at the same time, to adjust the surface tension of the liquid material so that the liquid material can be printed normally. In the present application, as long as the flatting agent used can meet the above performance requirements, the choice of a specific flatting agent is not limited, for example, the flatting agent may be BYK333, BYK377, BYK1798, BYK-UV3530, BYK-UV3575, BYK-UV3535, etc. from BYK Co., Ltd., TEGO wet 500, TEGO wet 270, TEGO Glide450, TEGO RAD 2010, TEGO RAD 2011, TEGO RAD 2100, TEGO RAD 2200, etc. from TEGO Co., Ltd.

The function of the defoamer is to inhibit, reduce or eliminate bubbles in the liquid material. In the present application, as long as the defoamer used can achieve the above effects, there is no restriction on which defoamer to choose, for example, it can be BYK055, BYK088, BYK020, BYK025, etc. from BYK Co., Ltd.; TEGO Airex 920, TEGO Airex 921, TEGO Airex 986, TEGO Foamex 810, TEGO Foamex N, etc. from TEGO Co., Ltd.; and Efka 7081, Efka7082 etc. from Efka Co., Ltd.

The function of the polymerization inhibitor may be to improve the stability of the active component at a high temperature, or to prevent the polymerization of the active component in non-printing state and improve the storage stability of the liquid material. For example, the polymerization inhibitor may be hydroquinone, p-hydroxyanisole, p-benzoquinone, 2-tert-butylhydroquinone, phenothiazine, etc., or may be GENORAD*16, GENORAD*18, GENORAD*20, GENORAD*22, etc. from Rahn, Tinuvin234, Tinuvin770, Irganox245, Cytec S100, Cytec130, etc. from BASF, and Irgastab UV10, Irgastab UV 22, etc. from Cibay.

The function of the surfactant is to adjust the surface tension of the active component so as to allow the active componentit to be suitable for inkjet printing, and to improve the fluidity of the composition and the wettability on the powder material. For example, the surfactant may be BYK333, BYK325N, BYK345, BYK346, BYK370 and BYK800D from BYK company, and TEGO 4000, TEGO WET 260, TEGO WET 270, TEGO WET KL245, TEGO Airex 920 and TEGO Airex 921 from TEGO company.

The function of the antioxidant is mainly to delay or inhibit the oxidation of the polymer, and for example, the antioxidant may be 2,6-di-tert-butyl-4-methylphenol, β-tetra [3-(3,5-di-tert-butyl-4-hydroxyphenyl)propionic acid]pentaerythritol ester, β-(3,5-di-tert-butyl-4-hydroxyphenyl)propionic acid n-octadecyl alcohol ester, 1,1,3-tris(2-methyl-4-hydroxy-5-tert-butylphenyl)butane, 4-[(4,6-dioctylthio-1,3, 5-triazine-2-yl)amino]-2,6-di-tert-butylphenol, dilauryl thiodipropionate, tri(nonylphenyl)phosphorous acid ester, triphenyl phosphite, 2-mercaptobenzimidazole, etc.

The function of the plasticizer is mainly to improve the toughness of the finished three-dimensional object, and the plasticizer may be, for example, dioctyl phthalate, butyl benzyl phthalate, diisononyl phthalate, diisodecyl phthalate, diethyl adipate, dibutyl adipate, diisobutyl adipate, di(2-butoxyethyl) adipate, di(2-ethylhexyl) adipate, triethyl citrate, triethyl acetyl citrate, tributyl citrate and tributyl acetyl citrate.

The function of the dispersant is mainly to improve the dispersion stability of colorant. For example, the choice of a specific dispersant is not limited. At present, there are many dispersant products on the market, for example, BYK102, BYK108, BYK110, BYK180, BYK9133, BYK9076, BYK9131, TEGO Dispers655, Dispers675, Dispers688, Dispers750, Dispers670, etc.

Further, the liquid material also includes a colorant, and a mass ratio of the colorant in the liquid material is 0-10%, for example, 0%, 1%, 2%, 4%, 6%, 8% or 10%. Of course, its mass ratio may also be assigned according to the actual usage, and is not limited here.

When the liquid material does not contain the colorant, since the active component dissolves the powder material, the polymer formed by the polymerization reaction of the active component is mixed with the powder material at molecular level. At this time, it is easy to obtain a colorless or light-colored transparent three-dimensional object.

When the liquid material contains the colorant, it is possible to realize the chromatic three-dimensional object. The colorant may be a dye or a pigment. Specifically, the pigment may be selected from one or more of C.I. Pigment White 6, C.I. Pigment Red 3, C.I. Pigment Red 5, C.I. Pigment Red 7, C.I. Pigment Red 9, C.I. Pigment Red 12, C.I. Pigment Red 13, C.I. Pigment Red 21, C.I. Pigment Red 31, C.I. Pigment Red49:1, C.I. Pigment Red 58:1, C.I. Pigment Red 175; C.I. Pigment Yellow 63, C.I. Pigment Yellow 3, C.I. Pigment Yellow 12, C.I. Pigment Yellow 16, C.I. Pigment Yellow 83; C.I. Pigment Blue 1, C.I. Pigment Blue 10, C.I. Pigment Blue B, Phthalocyanine Blue BX, Phthalocyanine Blue BS, C.I. Pigment Blue61:1, etc.

Specifically, the dye may be selected from C.I. acid red 37, C.I. acid red 89 (weak acid red 3B, 2BS), C.I. acid red 145 (weak acid bright red GL), C.I. acid orange 67 (weak acid yellow RXL), C.I. acid orange 116 (acid orange AGT), C.I. acid orange 156 (weak acid orange 3G), C.I. acid yellow 42 (weak acid yellow Rs, acid yellow R), C.I. acid yellow 49 (acid yellow GR200), C.I. acid blue 277, C.I. acid blue 344, C.I. acid blue 350, C.I. acid blue 9 (brilliant blue FCF), C.I. green 17, C.I. acid green 28, C.I. acid green 41, C.I. acid green 81, C.I. acid violet 17 (acid violet 4BNS), C.I. acid violet 54 (weak acid brilliant red 10B), C.I. acid violet 48, C.I. acid brown 75, C.I. acid brown 98, C.I. acid brown 165, C.I. acid brown 348, C.I. acid brown 349, C.I. acid black 26, C.I. acid black 63, C.I. acid black 172, C.I. acid black 194, C.I. acid black 210, C.I. acid black 234, C.I. acid black 235, C.I. acid black 242, etc.

In the additive manufacturing process of the three-dimensional object in the present embodiment, the active component is polymerized to form the slice layer of the three-dimensional object, and there is no small molecular substance residue in the manufactured three-dimensional object, and no small molecular substance is precipitated in the use process, meeting the requirements of safety and environmental protection.

Table 1 lists examples of composition of some liquid materials in the present application.

| Composition | Example 1 | Example 2 | Example 3 | Example 4 |
|---|---|---|---|---|
| First active component | 45.5% of acryloyl morpholine | 79.38% of ε-caprolactone | 77.45% of γ-butyrolactone | 50% of acryloyl morpholine; 20% of ε-caprolactone |
| Second active component | 30% of cyclotrihydroxymethylpropane methylal acrylate; 5% of bifunctional polyurethane oligomer | 15% of lactide | 20% of lactide | 15% of isobornyl acrylate; 10% of epoxy resin E-41 |
| Monomer containing expanding group | 12% of 3,9-diethyl-3,9-propenyloxymethyl-1,5,7,11-tetraoxaspiro[5,5]undecane | 5% of 3,9-dihydroxyethyl-3',9-diphenylmethyl-1,5,7,11-tetraoxaspiro[5,5]undecane | 2% of 3,9-dihydroxyethyl-3',9'-diphenylmethyl-1,5,7,11-tetraoxaspiro[5,5]undecane | 2% of 3,9-diethyl-3,9-propenyloxymethyl-1,5,7,11-tetraoxaspiro[5,5]undecane |
| Initiator or catalyst | 1% of TPO; 0.5% of IRGACURE 250 | 0.045% of stannous caprylate; 0.075% of glycol | 0.05% of tetraphenylporphyrin aluminide | 2% of IRGACURE 250; 0.5% of stannous caprylate |
| Flatting agent | 0.1% of BYK333 | 0 | 0 | 0 |
| Defoamer | 0.1% of TEGO Airex 920 | 0 | 0 | 0 |
| Polymerization inhibitor | 0.1% of GENORAD*16 | 0 | 0 | 0.1% of polymerization inhibitor MEHQ; 0.1% of polymerization inhibitor 510 |
| Surfactant | 0.1% of BYK345 | 0.1% of BYK345 | 0.1% of BYK345 | 0 |
| Antioxidant | 0.1% of antioxidant BHT | 0.2% of antioxidant 1010; 0.2% of antioxidant 168 | 0.2% of antioxidant 1010; 0.2% of antioxidant 168 | 0.3% of antioxidant 1010 |

-continued

| Composition | Example 1 | Example 2 | Example 3 | Example 4 |
|---|---|---|---|---|
| Plasticizer | 5% of triethyl citrate | 0 | 0 | 0 |
| Dispersing agent | 0.2% of BYK108 | 0 | 0 | 0 |
| Colorant | 0.3% of Yellow Phase Red Pulp (Penn Color 9R1519) | 0 | 0 | 0 |

As shown in the table above, the liquid material of Example 1 has a good molding effect on some powder materials such as polyurethane powder, poly(meth)acrylate and cellulose acetate. The liquid material of Example 2 has a good molding effect on some polyurethane powders and chlorinated polyolefin. The liquid material of Example 3 has a good molding effect on some powders, for example, polyacrylonitrile, acetate fiber, polymethyl methacrylate, polyvinyl fluoride, polystyrene and the like. The liquid material of Example 4 has a good molding effect on some powders, for example, polyurethane powder, cellulose acetate and the like, where epoxy resin E-41 and ε-caprolactone may form the expanding group in the reaction.

Figure 2:
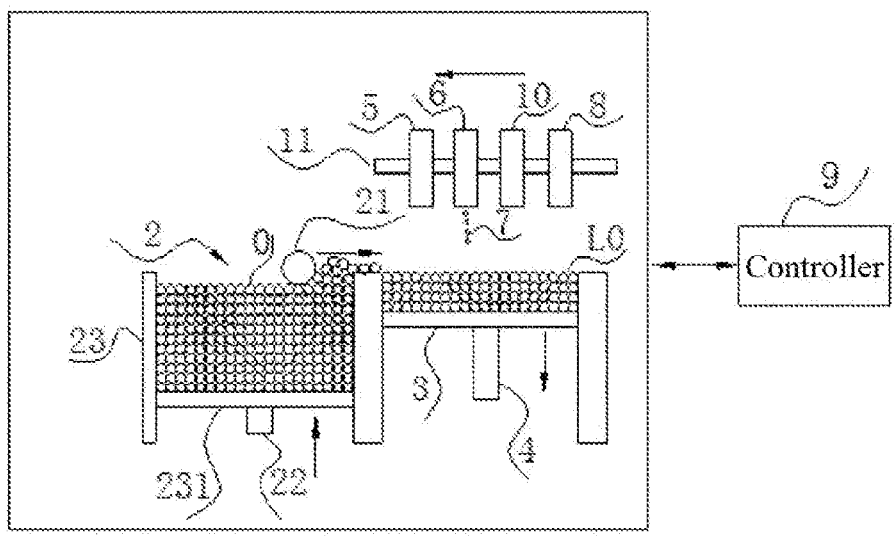
FIG. 2 is a schematic structural diagram of a three-dimensional object additive manufacturing device provided by a specific embodiment of the present application.

FIG. 2 is a schematic structural diagram of a three-dimensional object additive manufacturing device provided by a specific embodiment of the present application. As shown in FIG. 2, the embodiment of the present application also provides a three-dimensional object additive manufacturing device for implementing the above three-dimensional object additive manufacturing method, and the device includes:

a powder supply component 2, configured to supply the powder material to form the powder material layer;

a molding platform 3, configured to support the powder material layer;

a material distributor 6, configured to apply a liquid material onto the powder material layer according to the layer printing data, where the liquid material dissolves at least part of the powder material, and the liquid material includes an active component capable of polymerization;

an energy supply device 8, configured to supply energy to the powder material layer so that the active component in the liquid material is polymerized, and the powder material itself is not polymerized and does not polymerize with the active component, and the area of the powder material layer to which the liquid material is applied is molded to obtain the slice layer of the three-dimensional object.

In the present embodiment, the powder supply component 2 includes a powder storage chamber 23, a lifter 22 and a powder spreader 21, where the powder storage chamber is configured to store a powder material 0, and the powder storage chamber 23 is internally provided with a movable support plate 231; the lifter 22 is connected with the support plate 231 and may drive the support plate 231 to rise or fall in Z direction; the powder spreader 21 is used to spread the powder material 0 in the powder storage chamber 23 onto the molding platform 3 to form a powder material layer L0, and a commonly used powder spreader 21 may be a powder spreading roller or a scraper.

The material distributor 6 is an inkjet printing head, and the printing head may be a single-channel printing head or a multi-channel printing head. In the present embodiment, the number of the printing head depends on the type of the liquid material used and the amount of the liquid material to be applied. For example, when the liquid material includes functional materials with different colors, the liquid materials with different colors are ejected through different printing heads or different channels of the same printing head. For example, when the amount of the liquid material to be applied is large and the volume of a single ink drop is not enough to meet the demand, in order to improve the printing efficiency, multiple printing heads or multiple channels may be used simultaneously to eject the same type of material.

The energy provided by the energy supply device 8 may be radiant energy or thermal energy, and the energy supply device may be selected from at least one of an ultraviolet lamp, an infrared lamp, a microwave emitter, a heating wire, a heating fin and a heating plate. It should be noted that which type of energy supply device should be specifically selected is related to the type of the active component in the liquid material or related to the type of the active component and the type of the first auxiliary agent. When the active component in the liquid material undergoes a photopolymerization, the energy supply device 8 provides the radiant energy such as ultraviolet radiation, and the photopolymerization of the active component is initiated through the ultraviolet radiation. When the active component in the liquid material undergoes a thermal polymerization, the energy supply device provides the thermal energy, for example, an infrared lamp, a microwave, a heating wire, a heating fin and a heating plate, and the thermal polymerization of the active component is initiated by the thermal energy.

In a feasible implementation, the three-dimensional object additive manufacturing device further includes a lifting mechanism 4, and the lifting mechanism 4 is connected with the molding platform 3 and drives the molding platform 3 to ascend or descend in a vertical direction.

In a feasible implementation, the three-dimensional object additive manufacturing device further includes a preheating component 5 and/or a heating component 10, where the preheating component 5 is configured to preheat the powder material layer and promote the active component in the liquid material to dissolve the powder material; the heating component 10 is configured to heat the powder material layer after the liquid material is applied, and promote the active component in the liquid material to dissolve the powder material. The preheating component 5 and the heating component 10 may each be selected from at least one of an ultraviolet lamp, an infrared lamp, a microwave emitter, a heating wire, a heating fin and a heating plate.

In the present embodiment, the preheating component 5, the material distributor 6, the heating component 10 and the energy supply device 8 may be sequentially installed on a guide rail 11 and may move on the guide rail 11. In the present embodiment, when the energy supply device 8 is a device for supplying heat energy, the heating component 10 may be omitted, and the energy supply device 8 is used to heat the powder material layer to which the liquid material is applied and to initiate the polymerization reaction.

The three-dimensional additive manufacturing device may further include a temperature monitor (not shown) for monitoring the temperature of the powder material layer.

Furthermore, the three-dimensional object additive manufacturing device further includes a controller 9 for controlling the operation of at least one of the powder supply component 2, the material distributor 6, the energy supply device 8, the preheating component 5, the heating component 10 and the temperature monitor. For example, the temperature monitor feeds a monitored temperature back to the controller 9, and the controller controls the amount of energy provided by the preheating component 5 and/or the heating component 10 and the energy supply device 8 according to the information fed back by the temperature monitor.

Figure 3:
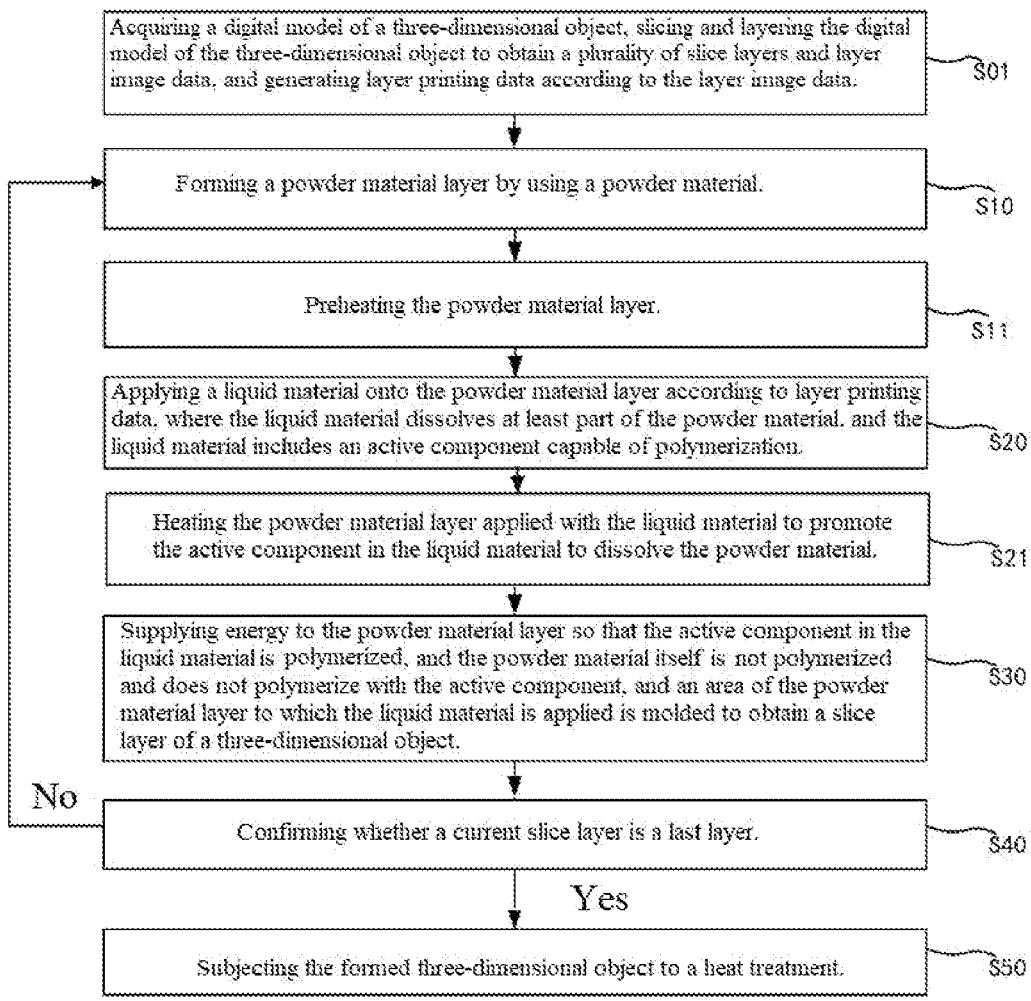
FIG. 3 is a flow chart of a three-dimensional object additive manufacturing method in another embodiment of the present application.

FIG. 3 is a flow chart of a three-dimensional object additive manufacturing method in another embodiment of the present application. As shown in FIG. 3, the three-dimensional object additive manufacturing method will be further explained in detail in combination with the three-dimensional object additive manufacturing device.

Step S01, acquiring a digital model of a three-dimensional object, slicing and layering the digital model of the three-dimensional object to obtain a plurality of slice layers and layer image data, and generating layer printing data according to the layer image data.

In a specific implementation, original data of the three-dimensional object may be obtained by scanning and is used for three-dimensional modeling to obtain the digital model of the three-dimensional object, or a three-dimensional object model is constructed by designing to obtain the digital model of the three-dimensional object, and the digital model is subjected to data format conversion, for example, it is converted to STL format, a PLY format, a WRL format and other formats that can be recognized by slicing software, and then the slicing software is used for slicing and layering the model to obtain slice layer image data, and the layer image data is processed to obtain layer printing data indicating the object. The layer printing data includes information indicating the shape of the object and/or information indicating the color of the object.

Figure 4A:
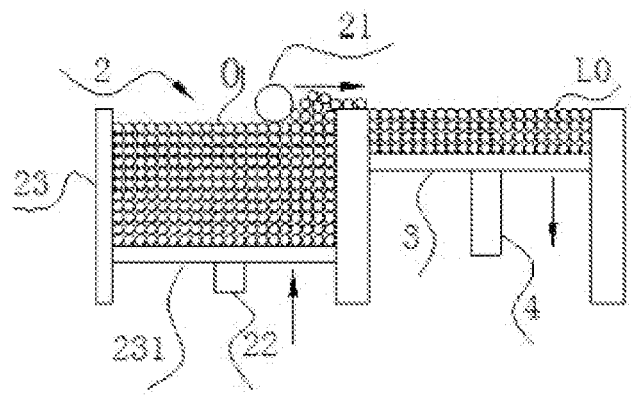
FIGS. 4a-4g are schematic structural diagrams of a formation process of a three-dimensional object provided by a specific embodiment of the present application.

Step S10, forming a powder material layer by using the powder material. As shown in FIG. 4*a*, in a specific embodiment, a powder supply component 2 may be used to supply a powder material 0 to a molding platform 3 so as to form a powder material layer L0.

Figure 4B:
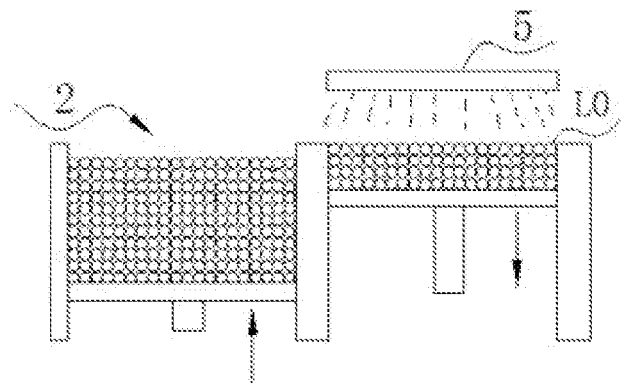

Step S11, preheating the powder material layer. As shown in FIG. 4*b*, in a specific embodiment, after the powder material layer L0 is formed, the preheating component 5 preheats the powder material layer L0 to increase the temperature of the powder material, which helps to promote a dissolution rate of the active component to the powder material when the liquid material is applied onto the powder material layer L0 in step S20. The preheating temperature is related to the properties of the used powder material, and preferably, the preheating temperature is lower than a melting point or a melting temperature of the powder material. Understandably, in the present embodiment, by controlling the preheating temperature to be lower than the melting point or melting temperature of the powder material, it is possible to prevent the powder material from sticking, and is beneficial for the liquid material to penetrate into the gaps between the particles of the powder material, thereby improving the dissolution rate of the active component to the powder material.

Figure 4C:
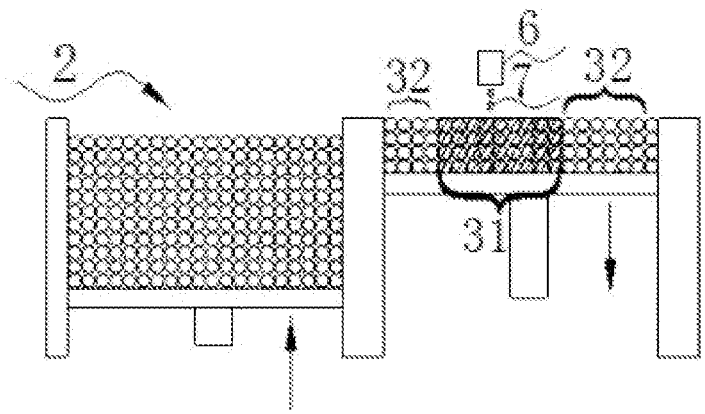

Step S20, applying a liquid material onto the powder material layer according to the layer printing data. As shown in FIG. 4*c*, in a specific embodiment, the material distributor 6 may apply the liquid material 7 onto the powder material layer L0 according to the layer printing data to form a layer patterned area 31; the liquid material 7 penetrates into the gaps of the powder material and covers the surface layer of the powder material, thereby wetting the surface of the powder material.

Figure 4D:
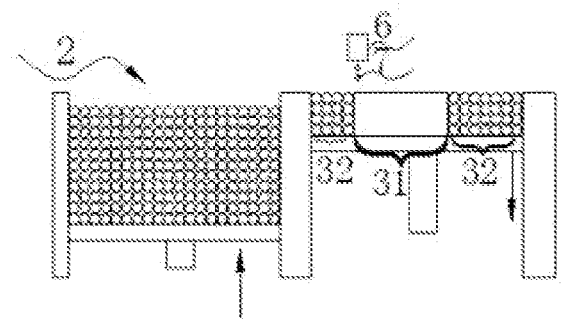

The liquid material 7 includes an active component capable of polymerization, and the active component dissolves at least part of the powder material. As shown in FIG. 4*d*, the powder material in the layer patterned area 31 is dissolved by the active component, so that the powder material and the active component are mixed at a molecular level.

Figure 4E:
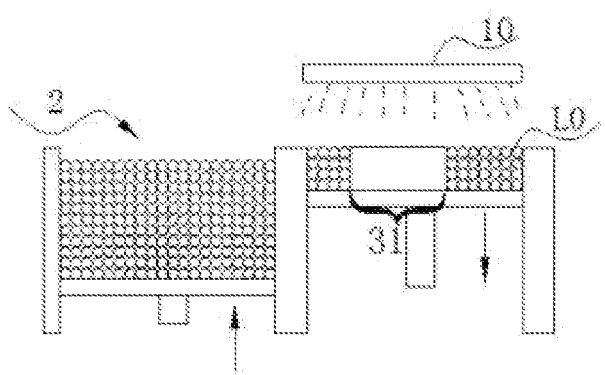

Step S21, heating the powder material layer applied with the liquid material to promote the active component in the liquid material to dissolve the powder material. As shown in FIG. 4*e*, the heating component 10 heats the powder material layer L0 to which the liquid material 7 is applied, further promoting the active component to dissolve the powder material, so that the powder material can be completely dissolved in a short time, and the powder material and the active component are mixed at the molecular level and evenly, so as to enable the active component to be polymerized, and the formed polymer and the powder material are also mixed at the molecular level, thereby forming a polymer alloy and improving the mechanical strength of the formed three-dimensional object.

Figure 4F:
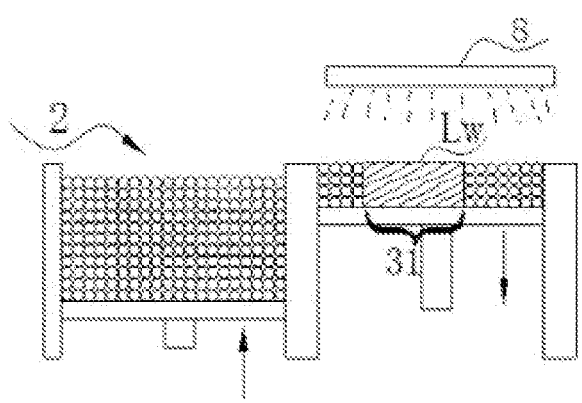

Step S30, supplying energy to the powder material layer so that the active component in the liquid material is polymerized, and an area of the powder material layer to which the liquid material is applied is molded to obtain the slice layer of the three-dimensional object. As shown in FIG. 4*f*, in a specific embodiment, the energy supply device 8 supplies the energy to the powder material layer L0, so as to enable the active component to be polymerized to form a high-molecular polymer, to form a slice layer Lw of the three-dimensional object.

As shown in FIG. 4*f*, the energy provided by the energy supply device 8 may further promote the active component to dissolve the powder material, and the active component is polymerized to form high-molecular polymer, and the formed high-molecular polymer blends with the powder material to form a blend, especially blends with the dissolved powder materials at a molecular level, to form a high-molecular polymer alloy, so that there are good connection between the powder materials, between the powder material and the polymer of the active component, and between the molded slice layers of three-dimensional object. In addition, the formed high-molecular polymer can be mixed with the powder material to obtain a "sea-island structure" or a homogeneous structure with good interface bonding, thereby improving the mechanical strength of the three-dimensional object.

In the present embodiment, in three-dimensional object additive manufacturing process, the material distributor 6 applies the liquid material 7 onto the powder material layer L0 according to the layer printing data, and the three-dimensional object with different properties in different areas can be realized by adjusting a spraying amount of the liquid material.

After step S30, the method further includes: step S40, confirming whether a current slice layer is a last layer.

When it is confirmed that the current slice layer is not the last layer, formation of the powder material layer and application of the liquid material are conducted repeatedly, and energy is supplied to at least part of the powder material layer to which the liquid material is applied, and the obtained slices are stacked layer by layer to form a three-dimensional object.

Figure 4G:
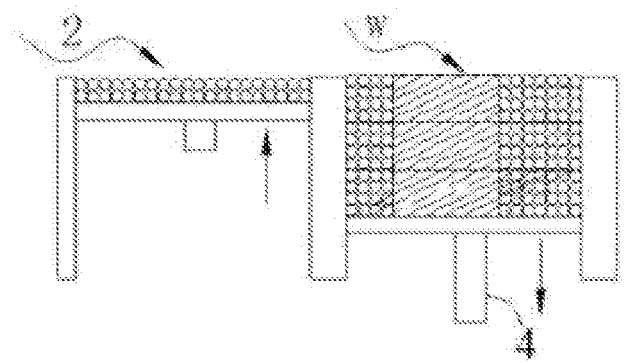

As shown in FIG. 4g, in the printing process of the three-dimensional object, after every one slice layer $L_w$ of the three-dimensional object is formed, the molding platform 3 is driven by the lifting mechanism 4 to descend by a distance of at least one layer thickness, the powder supply component 2 provides a new powder material layer L0 on the previously formed layer, the liquid material distributor 6 applies the liquid material 7 onto the powder material layer L0 according to the layer printing data to form a new layer patterned area 31, and the energy supply device 8 supplies energy to the layer patterned area 31 to form a new slice layer of the three-dimensional object; and a three-dimensional object W is formed by repeating this process.

Step S50, when it is confirmed that the current slice layer is the last layer, subjecting the formed three-dimensional object to a heat treatment so as to improve the mechanical strength of the three-dimensional object.

In a specific embodiment, after the three-dimensional object W is obtained, the whole three-dimensional object W is heated by using the preheating component 5 and/or the heating component 10, or the whole three-dimensional object W is taken out and placed into a heating furnace (not shown) for heating, so that on one hand, the dissolution effect of the powder material is better, the porosity among powder materials is reduced, and the compactness of the molded object is higher, on the other hand, the active component is further polymerized, thereby improving the tensile strength of the three-dimensional object W.

Figure 5:
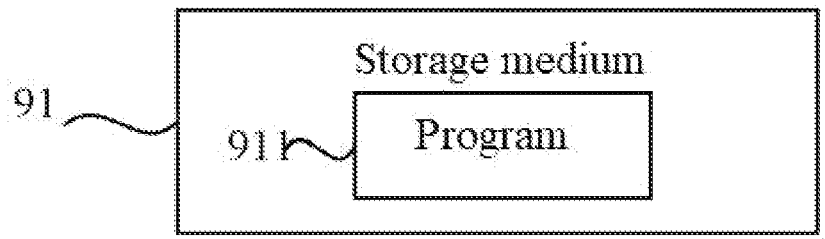
FIG. 5 is a schematic structural diagram of a storage medium provided in an embodiment of the present application.

An embodiment of the present application also provides a non-transitory computer-readable storage medium, as shown in FIG. 5, the storage medium 91 includes a stored program 911, and when the program runs, the apparatus where the storage medium 91 is located is controlled to execute the above-mentioned three-dimensional object additive manufacturing method.

Figure 6:
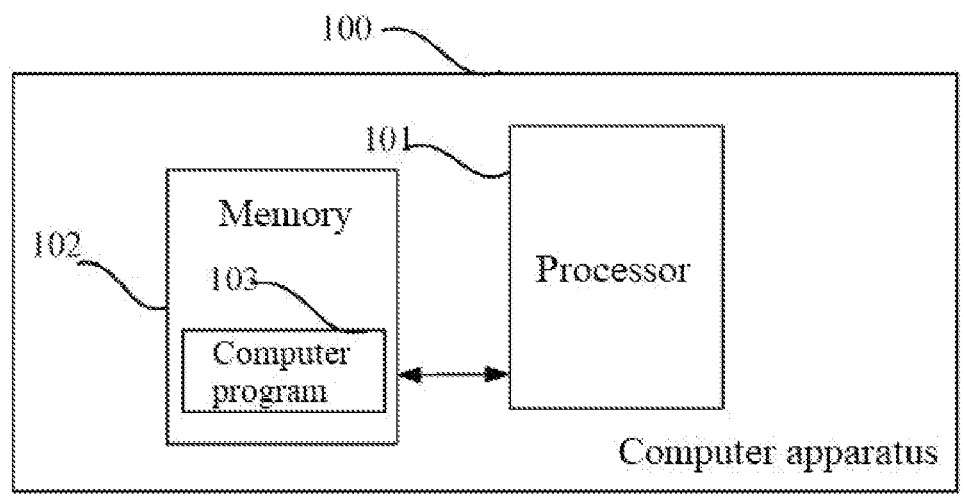
FIG. 6 is a schematic structural diagram of a computer apparatus provided in an embodiment of the present application.

An embodiment of the present application also provides a computer apparatus, as shown in FIG. 6. The computer apparatus 100 of the present embodiment includes a processor 101, a memory 102, and a computer program 103 stored in the memory 102 and executable on the processor 101. When the processor 101 executes the computer program 103, the three-dimensional object additive manufacturing method of the embodiments is realized, which will not be described here, so as to avoid repetition.

The computer apparatus 100 may be a desktop computer, a notebook computer, a palm computer, a cloud server and other computing apparatus. The computer apparatus may include, but is not limited to, the processor 101 and the memory 102. It can be understood by those skilled in the art that FIG. 6 is only an example of the computer apparatus 100, and does not constitute a limitation on the computer apparatus 100. It may include more or less components than those shown in the figure, or some components or different components may be combined. For example, the computer apparatus may also include input and output apparatuses, a network access apparatus, a bus, etc.

The processor 101 may be a central processing unit (CPU), or other general-purpose processor, a digital signal processor (DSP), an application specific integrated circuit (ASIC), a field-programmable gate array (FPGA) or other programmable logic device, a discrete gate or a transistor logic device, a discrete hardware component, etc. The general-purpose processor may be a microprocessor or the processor may be any conventional processor or the like.

The memory 102 may be an internal storage unit of the computer apparatus 100, such as a hard disk or a memory of the computer apparatus 100. The memory 102 may also be an external storage apparatus of the computer apparatus 100, such as a plug-in hard disk, a smart media card (SMC), a secure digital (SD) card, a flash card, etc., which are provided on the computer apparatus 100. Further, the memory 102 may also include both the internal storage unit and the external storage apparatus of the computer apparatus 100. The memory 102 is used to store a computer program and other program and data required by the computer apparatus. The memory 102 may also be used to temporarily store data that has been output or will be output.

The above are only the preferred embodiments of the present application, and are not intended to limit the present application. Any modifications, equivalent substitutions, improvements, etc. made within the spirit and principle of the present application should be included in the scope of protection of the present application.

What is claimed is:

1. A three-dimensional object additive manufacturing method, wherein the method comprises:
   forming a powder material layer by using a powder material;
   applying a liquid material onto the powder material layer according to layer printing data, wherein the liquid material dissolves at least part of the powder material, and the liquid material comprises an active component capable of polymerization; and
   supplying energy to the powder material layer so that the active component in the liquid material is polymerized, and the powder material itself is not polymerized and does not polymerize with the active component, and an area of the powder material layer to which the liquid material is applied is molded to obtain a slice layer of a three-dimensional object,
   wherein the active component comprises a first active component, the first active component has an active group, and the first active component dissolves at least part of the powder material,
   wherein the active component further comprises a second active component, the second active component has an active group, and the second active component does not dissolve the powder material,
   wherein the second active component is filled into a gap between particles of the powder material or inside the particle of the powder material.

2. The method according to claim 1, wherein the powder material is selected from at least one of polystyrene, polyvinyl chloride, polyacrylonitrile, acrylonitrile-styrene-acrylate copolymer, polyamide, polyester, polyurethane, poly(meth)acrylate, polyvinyl fluoride, chlorinated polyolefin, block copolymer soluble by the active component, graft copolymer soluble by the active component, polyvinyl alcohol containing hydroxyl group, cellulose, and modified cellulose.

3. The method according to claim 1, wherein the active component has an active group which is capable of participating in a polymerization reaction, and the active group comprises at least one of a carbon-carbon double bond, a hydroxyl group, a carboxyl group, a thiacyclopropane group, an isocyanate group, a carbonate group, an epoxy group, a cyclic amide group, a cyclic lactone structure, a cyclic anhydride structure and a cyclic acetal structure.

4. The method according to claim 1, wherein a mass ratio of the active component in the liquid material is 50%-100%.

5. The method according to claim 1, wherein the active component comprises the first active component having the active group and the second active component having the active group, wherein a mass ratio of the first active component in the liquid material is 10%-95%, and a mass ratio of the second active component in the liquid material is 10%-90%.

6. The method according to claim 1, wherein the first active component is selected from at least one of a monomer containing a carbon-carbon double bond, a composition of a substance containing an epoxy group and a substance promoting ring-opening polymerization of the epoxy group, a liquid cyclic lactone, a sulfur heterocycle compound, a carbonic ester compound and a cyclic amide compound.

7. The method according to claim 1, wherein the second active component is selected from at least one of a monomer and/or a prepolymer containing a carbon-carbon double bond, a diluent and/or a prepolymer containing an epoxy group, a monomer and/or a prepolymer promoting ring-opening polymerization of an epoxy group, a polyol, a solid cyclic lactone, a sulfur heterocycle compound and a cyclic amide compound.

8. The method according to claim 1, wherein the first active component and/or the second active component comprise(s) an expanding group, the expanding group is able to participate in a polymerization reaction, and the expanding group is selected from at least one of a spiro ether structure, a spiro orthocarbonate structure, a spiro orthoester structure, a bicyclo orthoester structure and a bicyclo lactone structure.

9. The method according to claim 8, wherein the first active component and/or the second active component comprise(s) a combination of the active groups, and the combination of the active groups forms the expanding group in the polymerization reaction;
wherein the combination of the active groups comprises any one of a combination of a polyol group and an orthocarbonic acid diester group, and a combination of an epoxy group and a cyclic lactone structure.

10. The method according to claim 1, wherein the liquid material further comprises a first auxiliary agent, and the first auxiliary agent comprises at least one of a free radical initiator, an anionic initiator, a cationic initiator and a catalyst; and/or, a mass ratio of the first auxiliary agent in the liquid material is 0%-10%;
wherein the liquid material further comprises a second auxiliary agent, and the second auxiliary agent comprises at least one of a flatting agent, a defoamer, a polymerization inhibitor, a surfactant, an antioxidant, a plasticizer and a dispersant; and/or, a mass ratio of the second auxiliary agent in the liquid material is 0.1%-30%;
wherein the liquid material further comprises a colorant, and a mass ratio of the colorant in the liquid material is 0%-10%.

11. The method according to claim 1, wherein before applying the liquid material onto the powder material layer according to the layer printing data, the method further comprises:
preheating the powder material layer;
wherein after applying the liquid material onto the powder material layer according to the layer printing data, the method further comprises:
heating the powder material layer after applying the liquid material, to promote the active component in the liquid material to dissolve the powder material;
wherein after supplying the energy to the powder material layer so that the active component in the liquid material is polymerized, and the area of the powder material layer to which the liquid material is applied is molded to obtain the slice layer of the three-dimensional object, the method further comprises:
repeatedly forming the powder material layer and applying the liquid material, and supplying energy to at least part of the powder material layer to which the liquid material is applied, and stacking a plurality of obtained slice layers layer by layer to form the three-dimensional object.

12. The method according to claim 1, wherein the energy comprises at least one of radiant energy and thermal energy.

13. The method according to claim 11, wherein after the three-dimensional object is formed, the method further comprises:
subjecting the formed three-dimensional object so as to a heat treatment to improve mechanical strength of the three-dimensional object.

14. A non-transitory computer-readable storage medium, wherein the storage medium comprises a stored program, and when the program runs, an apparatus where the storage medium is located is controlled to execute the three-dimensional object additive manufacturing method according to claim 1.

15. A non-transitory computer apparatus comprising a memory, a processor, and a computer program stored in the memory and executable on the processor, wherein the processor executes the computer program to implement the three-dimensional object additive manufacturing method according to claim 1.

* * * * *